United States Patent

McKewan

[11] 4,293,258
[45] Oct. 6, 1981

[54] SELF DRILLING BLIND RIVET

[75] Inventor: Arthur J. McKewan, Rochester, Mich.

[73] Assignee: Microdot Inc., Darien, Conn.

[21] Appl. No.: 56,209

[22] Filed: Jul. 10, 1979

Related U.S. Application Data

[63] Continuation of Ser. No. 839,340, Oct. 4, 1977, abandoned.

[51] Int. Cl.³ .................... F16B 13/06; E04B 1/49
[52] U.S. Cl. ........................ 411/30; 411/34; 411/43
[58] Field of Search ............. 85/68, 70, 72, 37; 408/83, 230; 411/30, 29, 31, 34, 43

[56] References Cited

U.S. PATENT DOCUMENTS

| | | | |
|---|---|---|---|
| 1,022,135 | 4/1912 | Heinkel et al. | 408/230 |
| 3,199,381 | 8/1965 | Mackey | 408/230 X |
| 3,385,156 | 5/1968 | Polos | 85/68 |
| 3,403,593 | 10/1968 | Moore | 85/68 |
| 3,438,301 | 4/1969 | Mattioli | 85/70 |
| 3,463,046 | 8/1969 | Welch et al. | 85/70 |
| 3,487,745 | 1/1970 | Brunelle | 85/68 |
| 3,534,419 | 10/1970 | Deans et al. | 85/72 X |
| 3,750,518 | 8/1973 | Rayburn | 85/70 X |
| 4,085,337 | 4/1978 | Moeller | 85/68 X |

*Primary Examiner*—Rodney H. Bonck
*Attorney, Agent, or Firm*—Harness, Dickey & Pierce

[57] ABSTRACT

A self drilling, closed end, blind rivet has a hexagonally shaped flange, or other suitably shaped means of driving, at one end and a hardened drill bit at the other end, with the two being joined by an integral sleeve wall with a rolled groove in it that forms an internal chamber to retain the head of a mandrel. Withdrawal load on the mandrel, after the rivet has been inserted through a hole drilled by it in a plurality of layers to be joined, will upset the sleeve wall into a folded flange that coacts with the hex head, or other driving means, to tightly grip the outside face and the blind face of the layers being joined.

5 Claims, 2 Drawing Figures

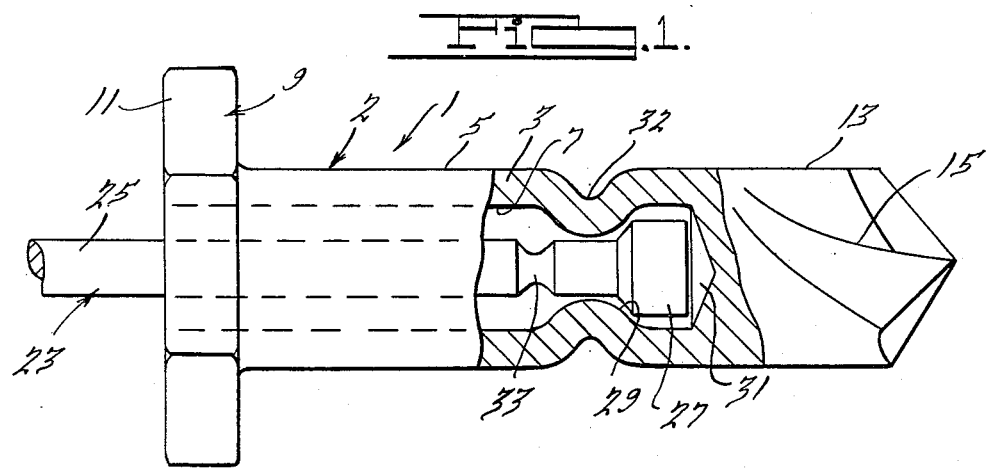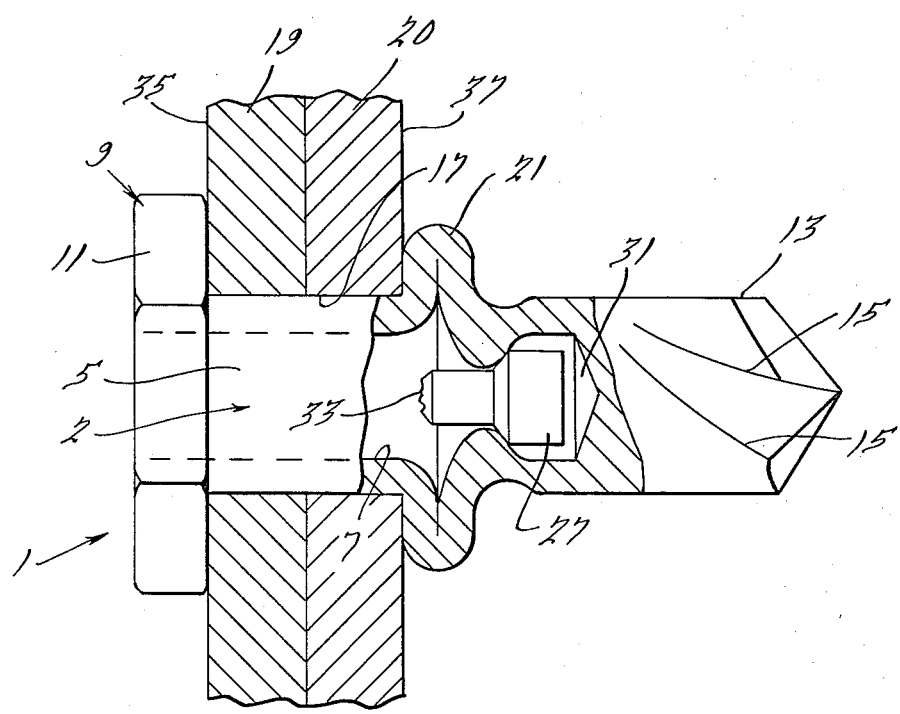

SELF DRILLING BLIND RIVET

This is a continuation of application Ser. No. 839,340, filed 10/4/1977, and now abandoned.

BRIEF SUMMARY OF THE INVENTION

It is the purpose of this invention to provide a closed end, self drilling rivet for blind setting.

The invention accomplishes this purpose by means of a one piece body that has a sleeve section with a radial outwardly extending flange at one end that serves as a clutch means and provides a shoulder to engage the outside surface of the pieces to be joined together by the rivet. The other end of the body is solid and harder than the sleeve portion and formed to have flutes that will drill a hole for the sleeve section when a torque producing power tool is in driving engagement with the clutch means on the radial flange. The rivet is preassembled with a mandrel that has an enlarged head trapped within the rivet by the formation of a constriction provided by inward radial deformation of the wall of the sleeve section. Preferably, the mandrel has a weakened portion adjacent the head which will fracture upon application of a tensile force on the mandrel in excess of the force required to upset the sleeve section into a radially outwardly extending pleat that serves as a flange engaging the layer surface on the blind side of the pieces being joined together.

DESCRIPTION OF THE DRAWINGS

FIG. 1 is a side elevation partly in section, and with the mandrel broken away, of a blind setting rivet embodying the invention and assembled with a mandrel for upsetting the rivet; and FIG. 2 is a view of the structure shown in FIG. 1 after it has been utilized to join two layers of material together.

DESCRIPTION OF THE INVENTION

The rivet 1 comprises a one piece body 2, preferably of relatively soft steel, that has a sleeve section 3 with substantially uniform outer and inner diameters 5 and 7 extending for a length that is ordinarily a large proportion of the overall length of the rivet 1. One end of the body 2 is shaped to form a flange 9 that extends in a radial direction with respect to the sleeve portion 3 and outwardly with respect to the outer diameter 5. The flange 9 is provided with means to receive torque so that the rivet may be rotated. This is illustrated as a series of six flat sides 11 which form a typical hex head that can act as a clutch means for engagement with a torque producing device (not shown), such as a power tool with a rotatable collet.

The other end 13 of the rivet 1 is of substantially the same diameter as the outer diameter 5 and is preferably solid. It is provided with flutes 15 (which may be squeeze formed in the soft steel) that have cutting edges which adapt the end 13 to serve as a drill bit. Thus, upon rotation of the body 2, the flutes 15 will drill a hole 17 in the parts 19 and 20 which are to be joined together. The flutes 15 are, of course, wide enough to form a hole 17 that will accept the diameter 5 of the sleeve section 3 and long enough to exceed the combined thickness of parts 19 and 20 so that drill chips can escape as the hole 17 is being drilled.

As seen in FIG. 2, the parts 19 and 20 are clamped between the head 9 and a flange 21 in the form of a U-shaped radial pleat or fold that extends outwardly in the wall of sleeve section 3. The flange 21 is formed by withdrawal of a mandrel 23 that is trapped inside of the body 2 in such a way that tensile force on the shank 25 of the mandrel compresses the sleeve wall until it collapses. U.S. Pat. No. 3,750,518 illustrates a prior method for accomplishing this. In accordance with the present invention, the enlarged head 27 of the mandrel is insertd to the bottom of the bore 7 and the wall 3 reduced in diameter to form an annular shoulder 29 which is smaller than the head 27, thereby trapping the head in the small chamber 31 at the blind end of the bore. A preferred way to form shoulder 29 is to roll an annular groove 32 into the wall of the sleeve section 3. This operation can also be used to remove any flash, burr, or flanges left after squeeze forming the flutes 15. Alternatively, the entire outer diameter 5 of the sleeve section up to the position where shoulder 29 is desired can be initially somewhat larger than the end 13 and then rolled down to its final diameter after insertion of the mandrel.

The shank 25 of the mandrel is weakened by suitable means, such as the reduced diameter portion 33. The shank 25 is still strong enough to apply a compressive load via the head 27 and shoulder 29 to upset the sleeve wall tightly against part 20 to produce pleat flange 21, but increasing tension or pull on the shank thereafter produces a fracture of section 33 as illustrated in FIG. 2. The rivet 1 is therefore in its final, operative, blind seated condition in FIG. 2 with the head 9 engaging the outside face 35 of the parts 19-20 and the flange 21 engaging the blind face 37 on the inside of part 20 and cooperating with the head to clamp the parts tightly together.

In order for the drill bit end 13 of the rivet to function it must be of harder material than the parts 19-20. At the same time the sleeve section that is upset into fold 21 must be relatively soft, i.e. have a sufficiently low elastic limit, to permit this drastic deformation without fracture. For most applications, therefore, the end 13 must be substantially harder than the sleeve section 3 of the body 2. This can be accomplished by various methods and means known to metallurgists for producing differential hardness in a one piece part. A relatively new and presently preferred method is described in the magazine IRON AGE for Jan. 10, 1977 in an article at page 25 by Roger O. Betz, entitled "New Energy Beam Has Many Metalworking Functions" which will permit hardness to be localized in the drill bit end 13 of the rivet. U.S. Pat. No. 3,947,653 is one of several referring to the method described in this article.

In operation, a suitable power tool is connected to the head 9 to rotate the rivet and apply axial pressure to it so that the drill bit 13 drills the hole 17 through the parts 19 and 20. During this operation the mandrel is free to rotate with or relative to the rivet or to be stationary. When the head 9 finally seats against the outside face 35 of part 19, axial pressure on the head 9 should be maintained and an axial tensile load applied to mandrel 23, by suitable means, to apply compression to shoulder 29 and upset the sleeve 3 into flange 21 and force it tightly against the blind face 37 of part 20, thus tightly clamping the parts together. Continued tension on the mandrel ruptures it at section 33 and the fastening operation is completed.

Thus, the invention has produced a one piece self-drilling, blind-setting rivet that may be readily driven by a power tool that rotates the rivet and pulls out the mandrel. Modifications in the specific details shown may be made without departing from the spirit and scope of the invention. For example, the shoulder 29 might be sized in such a way as to enable the mandrel head to escape after the sleeve is upset.

I claim:

1. A self drilling blind rivet comprising a hollow elongated rotatable one piece body of hardenable metal having flange means and torque receiving means formed therein at one end and having a thick second end with a hardened drill bit formed therein capable of drilling through metal parts, said torque receiving means enabling said body to be rotated whereby said drill bit may drill a hole through metal parts to be held together by the rivet, said body including a plastically deformable sleeve section extending between said flange means and torque receiving means and said drill bit and having a hardness significantly lower than said drill bit and low enough to enable it to be upset into a radial flange pleat by the application of axial compression to it whereby parts may be clamped between said flange means and said flange pleat, said body having a blind bore opening out of said one end, and a mandrel in and extending out of said bore and having a radially enlarged head located near the blind end of the bore and being slidable inside the bore, said sleeve section having a reduced diameter portion forming a radial shoulder engageable with said enlarged head for blocking removal of the mandrel from the bore and serving to transmit tension on the mandrel into axial compression on the sleeve section to enable said compression to cause it to collapse and form said flange pleat, said drill bit being a permanent part of the body and remaining integral with said body after said collapse of said sleeve section.

2. A rivet as set forth in claim 1 wherein said second end of the body is solid metal and said drill bit is formed in said solid metal, said sleeve section extending to said solid second end and said bore defining a substantially uniform thickness in the sleeve section along the length thereof.

3. A rivet as set forth in claim 2 wherein said flange means and torque receiving means comprise a hexagonal flange.

4. A rivet as set forth in claim 3 wherein said sleeve has a reduced diameter groove formed therein to provide said radial shoulder.

5. A rivet as set forth in claim 1 wherein said sleeve has a reduced diameter groove formed therein to provide said radial shoulder.

* * * * *